United States Patent [19]

Naimpally

[11] Patent Number: 4,845,547

[45] Date of Patent: Jul. 4, 1989

[54] NON-LINEAR COMB FILTER FOR COLOR TV RECEIVERS

[75] Inventor: Saiprasad V. Naimpally, Knoxville, Tenn.

[73] Assignee: North American Philips Corporation, New York, N.Y.

[21] Appl. No.: 173,955

[22] Filed: Mar. 28, 1988

[51] Int. Cl.$^4$ .............................................. H04N 9/78
[52] U.S. Cl. ...................................................... 358/31
[58] Field of Search .......................................... 358/31

[56] References Cited

U.S. PATENT DOCUMENTS

| 4,050,084 | 9/1977 | Rossi | 358/31 |
| 4,178,609 | 12/1979 | Beutel | 358/31 |

FOREIGN PATENT DOCUMENTS

| 1170760 | 7/1984 | Canada | 358/31 |
| 129891 | 8/1983 | Japan | 358/31 |
| 151592 | 8/1984 | Japan | 358/31 |
| 2054313 | 2/1981 | United Kingdom | 358/31 |

Primary Examiner—John W. Shepperd
Attorney, Agent, or Firm—Marianne R. Rich

[57] ABSTRACT

A comb filter for separating chrominance and luminance signals for each sample of a video signal adaptively selects exactly one line above or one line below for processing with the sample of interest. In the process, luminance and chrominance signals are obtained for both processing modes and coupled to a switch. Selection logic utilizes the chrominance signals established for each mode to sequentially check vertical correlation of the video signal, chrominance variations, and vertical detail to position the switch to choose the proper luminance and chrominance signal pair.

8 Claims, 6 Drawing Sheets

FIG. I
PRIOR ART

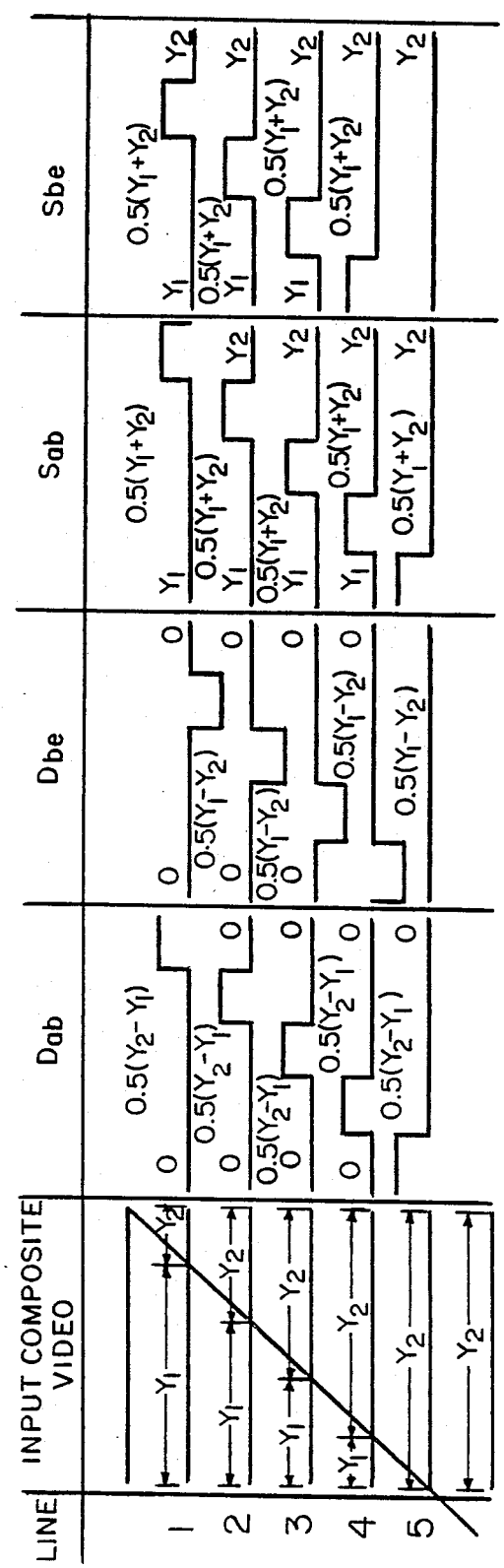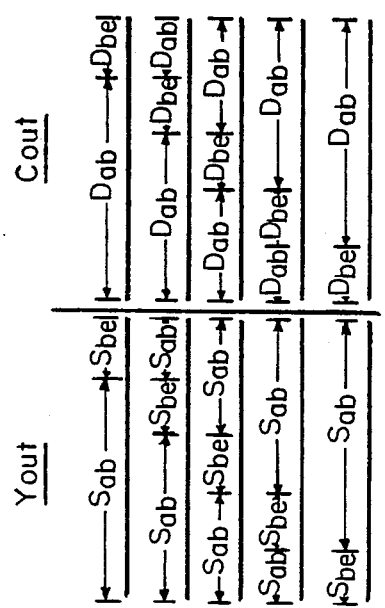
FIG. 6

NON-LINEAR COMB FILTER FOR COLOR TV RECEIVERS

BACKGROUND OF THE INVENTION

1. Field of the Invention

The present invention relates to color television receivers and more specifically to comb filters utilized in these receivers to separate the transmitted luminance and chrominance information.

2. Description of the Prior Art

Standard color television systems transmit the luminance and chrominance information separately. Luminance information is line locked to the horizontal scan, while the chrominance information is transmitted on a sub carrier having a frequency of 3.579545 MHz (227.5 X $f_h$). This choice of sub carrier provide luminance signals Y that are in phase from horizontal scan line to horizontal scan line and chrominance signals C that are 180 degrees out of phase on adjacent horizontal scan lines. At the video level a composite signal is established that is Y+C for one horizontal scan line and Y−C for the next horizontal scan line. These sum and difference video signals are utilized to separate the luminance video from the chrominance video.

In the prior art the composite video signal is coupled to a comb filter wherein it is delayed one horizontal line time, the delayed signal then being added to and subtracted from the composite signal of the next horizontal line; the sum providing a luminance video Y, the difference providing the chrominance video C. The combed chrominance signal is coupled through a low pass filter and summed with the combed luminance to restore some of the lost luminance vertical detail components, and also coupled through a bandpass filter for further processing.

Filters utilizing one horizontal scan line delay (1-H comb filter) effectively separate the chrominance and luminance signals on vertically correlated video signals thereby eliminating cross color and dot crawl. When the signals are not vertically correlated, however, the 1-H comb filter does not completely separate the Y and C components. This causes "hanging dots" on strong vertical color transitions and cross color components on high frequency diagonal Y transitions, especially when the diagonal detail is angled close to 45 degrees. The "hanging dots" artifact of 1-H comb filters is particularly offensive, since the luminance bandwidth in receivers employing 1-H comb filters is increased approximately 1 MHz over the 3 MHz utilized in older TV receivers wherein a 3.58 MHz trap is used. If the overall amplitude response of the receiver is of the Murakami type for optimum transient response and the phase response is linear, the amplitude of signals at frequencies at 3.58 MHz vicinity are considerably peaked, thus aggravating the "hanging dots" problem by making the dots very visible.

SUMMARY OF THE INVENTION

In accordance with the principles of the present invention an adaptive comb filter for separating the luminance and chrominance information contained in a composite video signal selectively combines the composite signal on one line with the composite signal on either the line above or the line below for each sample on the line. The choice for each sample is determined by initially comparing the difference signal obtained by subtracting the composite signal on the line above from the composite signal on the line presently being processed with the difference signal obtained by subtracting the composite signal on the line below with composite signal of the line presently being processed and comparing these two difference signals. If the difference between the two difference signals is substantially equal to zero, implying identical luminance and chrominance information on the line above and line below, the chrominance and luminance output signal obtained with the line above processing are chosen. Should the difference between the line above difference signal and the line below difference signal not be equal to zero, the system determines if the difference signal for the line above is approximately equal to zero, implying identical luminance information with no chrominance information on both the line in question and the line above, making the proper choice the luminance and chrominance output signals obtained by processing with the line above. Should the difference signal obtained by subtracting the composite signal on the line above with the composite signal on the line in question not be equal to zero, the difference signal obtained by subtracting the composite video signal on the line below with the composite signal on the line in question is investigated. If this difference signal is approximately equal to zero, the chrominance and luminance signals obtained by processing with the line below are selected.

The two difference signals obtained by subtracting the composite video signals on the line above and the line below from the composite video signal on the line under consideration are also each coupled to a low pass filter to remove the chrominance components from the two difference signals. If the difference signal obtained with the line below processing is not equal to zero the filtered line above difference signal is investigated. If this signal is approximately equal to zero, indicating no vertical transition from the line above, the luminance and chrominance signal obtained with the line above processing is chosen. If the filtered line above difference signal is not equal to zero the filtered line below difference signal is investigated. If this signal is approximately equal to zero then the luminance and chrominance signals obtained with line below processing are chosen. If the filtered line below difference signal is not equal to zero the luminance and chrominance signals obtained with line above processing are selected.

BRIEF DESCRIPTION OF THE DRAWINGS

FIG. 6 is a representation of diagonal transitions of the luminance signals.

DESCRIPTION OF THE PREFERRED EMBODIMENTS

Figure 1:
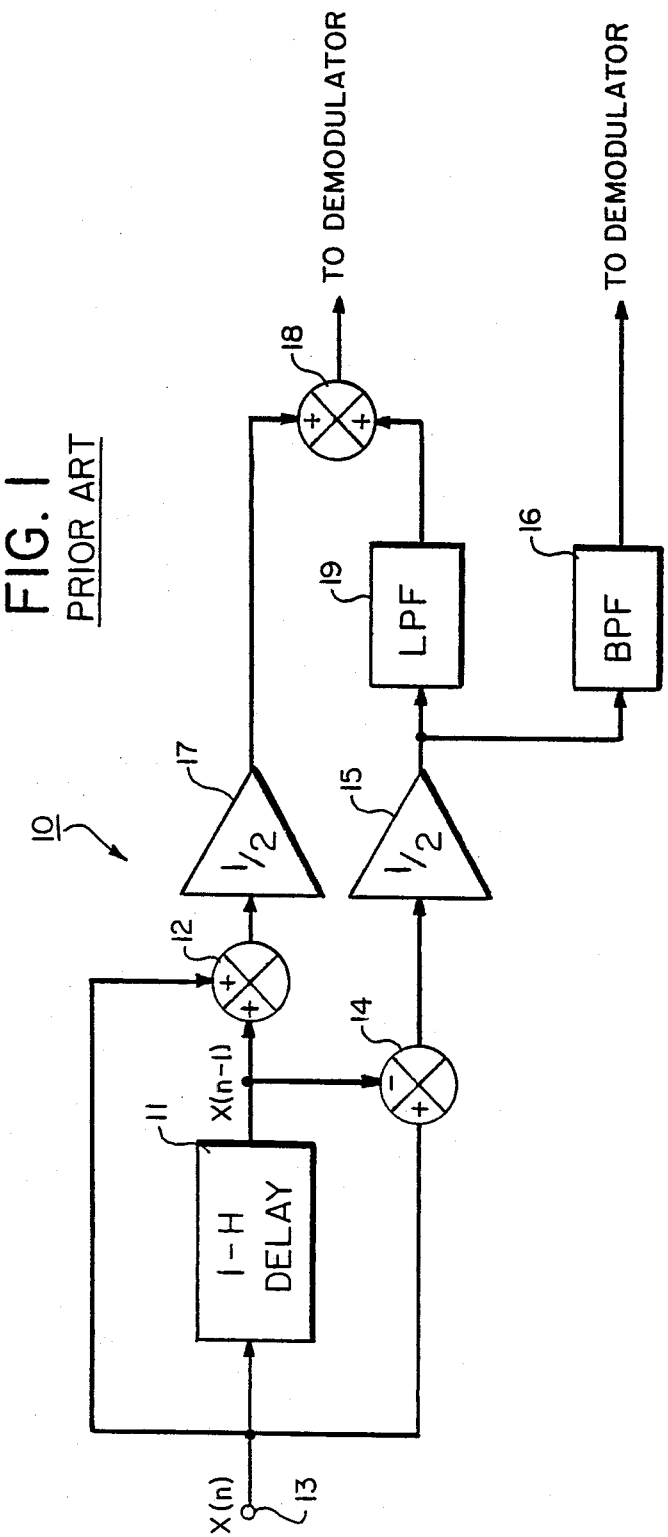
FIG. 1 is a block diagram of a comb filter utilized in the prior art for separating the luminance and chrominance signals from a composite video signal.
Figure 2:
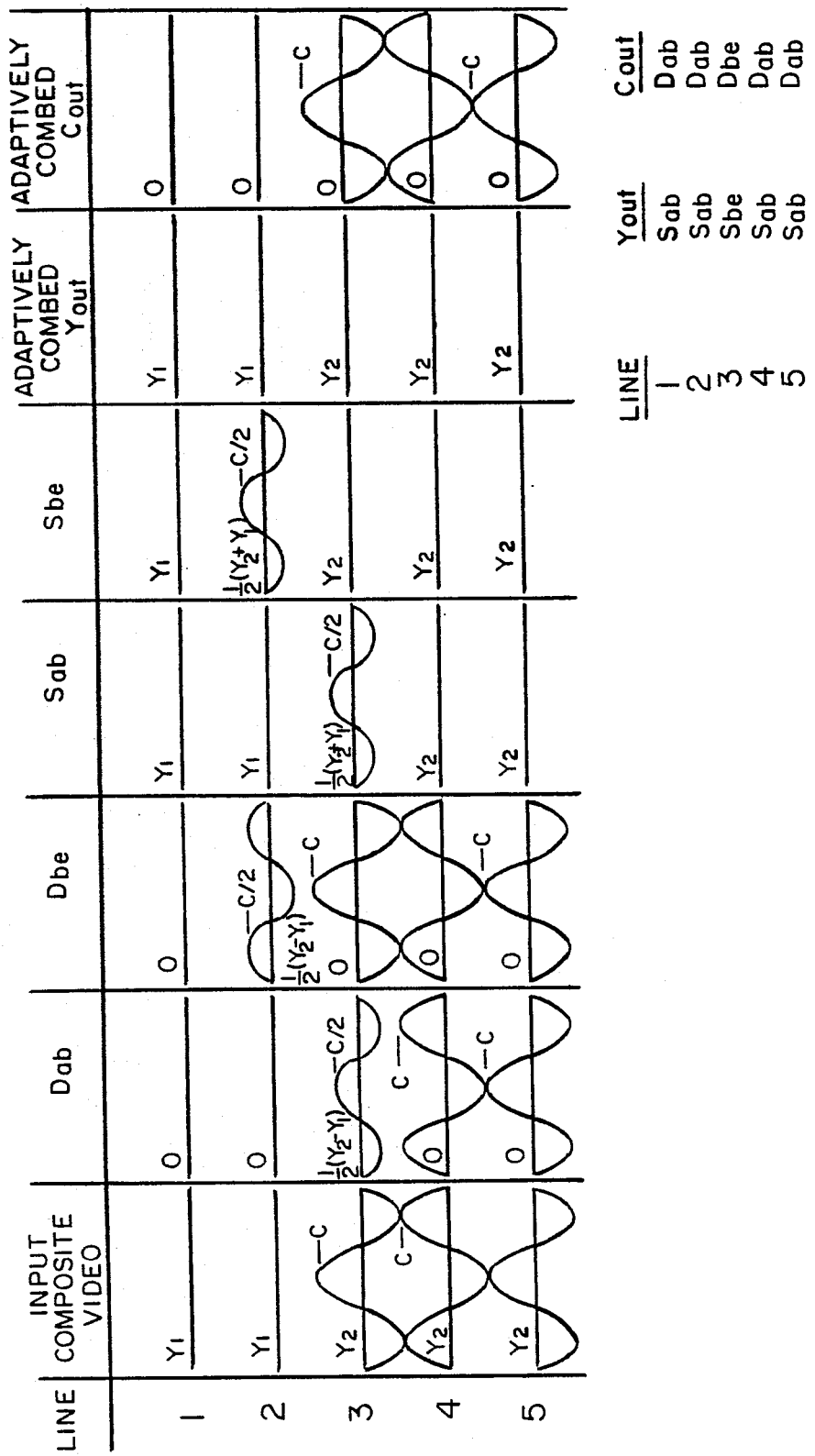
FIG. 2 is a representation of the luminance and the chrominance signals in the composite video signal.

In a comb filter 10 of the prior art, shown in FIG. 1, the composite video signal is delayed by delay line 11 for a time interval equal to the time required to complete one horizontal scan line. This delayed signal is coupled to summation network 12 which sums the delayed signal $x(n-1)$ with the current signal $x(n)$ at the input terminal 13 of the delay line 11 to obtain luminance signals. Chrominance signals are obtained by subtracting the delayed signal $x(n-1)$ from the current signal $x(n)$ at the input terminal 13. This chrominance signal is coupled through an amplifier 15 having an amplification factor of 0.5 and a band pass filter 16 to the receiver demodulator not shown. Luminance signals are coupled through an amplifier 17 having an amplification factor of 0.5 to a summation network 18 wherein the luminance signals are added to the chrominance signals passed through a low pass filter 19 to provide luminance signals to the demodulator, not shown, from the output terminals of the summation network 18 having vertical detailed components restored thereon previously removed by the filtering process. Filters of the prior art effective in completely separating the chrominance and luminance signals on vertically correlated video signals, thereby eliminating cross color and dot crawl. When the signals are not vertically correlated, however, these prior art filters do not completely separate the luminance and chrominance signals, causing "hanging dots" on strong vertical color transitions and cross color distortion on high frequency diagonal luminance transitions, especially when the diagonal detail is angled close to 45 degrees. This problem is illustrated in FIG. 2 wherein a luminance signal $Y_1$ without any chrominance is indicated on horizontal sweep line 2 and a luminance signal $Y_2$ with a chrominance signal having a peak value C is indicated on horizontal sweep line 3. When these signals are processed by the filter of FIG. 1, the sum signal $S_{ab}$ provides a luminance signal that is the average of $Y_2+Y_1$ with a chrominance ripple thereon having an amplitude C/2, while the difference signal $D_{ab}$ provides a chrominance signal with an amplitude C/2 riding on a luminance level that is equal to $\frac{1}{2}(Y_2-Y_1)$.

Hanging dots created by combining lines 2 and 3 to separate the luminance and chrominance signals for line 3 may be eliminated by combining line 3 with line 4, that is combining line 3 with the line below rather than the line above. In this situation the resultant chrominance signal for line 3 is provided by the difference signal $D_{be}$ having a chrominance signal of peak value C with a zero luminance signal thereon and a luminance signal provided by $S_{be}$ having a value $Y_2$ and no chrominance ripple thereon. Thus, the hanging dot problem may be eliminated by providing an adaptive filter which selects the line above or the line below for combining with the line of interest in accordance with the color transitions about the line of interest. To accomplish this, two sets of sum and difference signals are formed and compared to determine which set is selected to provide the chrominance and luminance signals for the given line. These sum and difference sets may be represented as follows:

$S_{ab}(n) = [x(n) + x(n-1)]/2$ $D_{ab}(n) = [x(n) - x(n-1)]/2$ $S_{be}(n) = [x(n) + x(n+1)]/2$ $D_{be}(n) = [x(n) - x(n+1)]/2$

Figure 3:
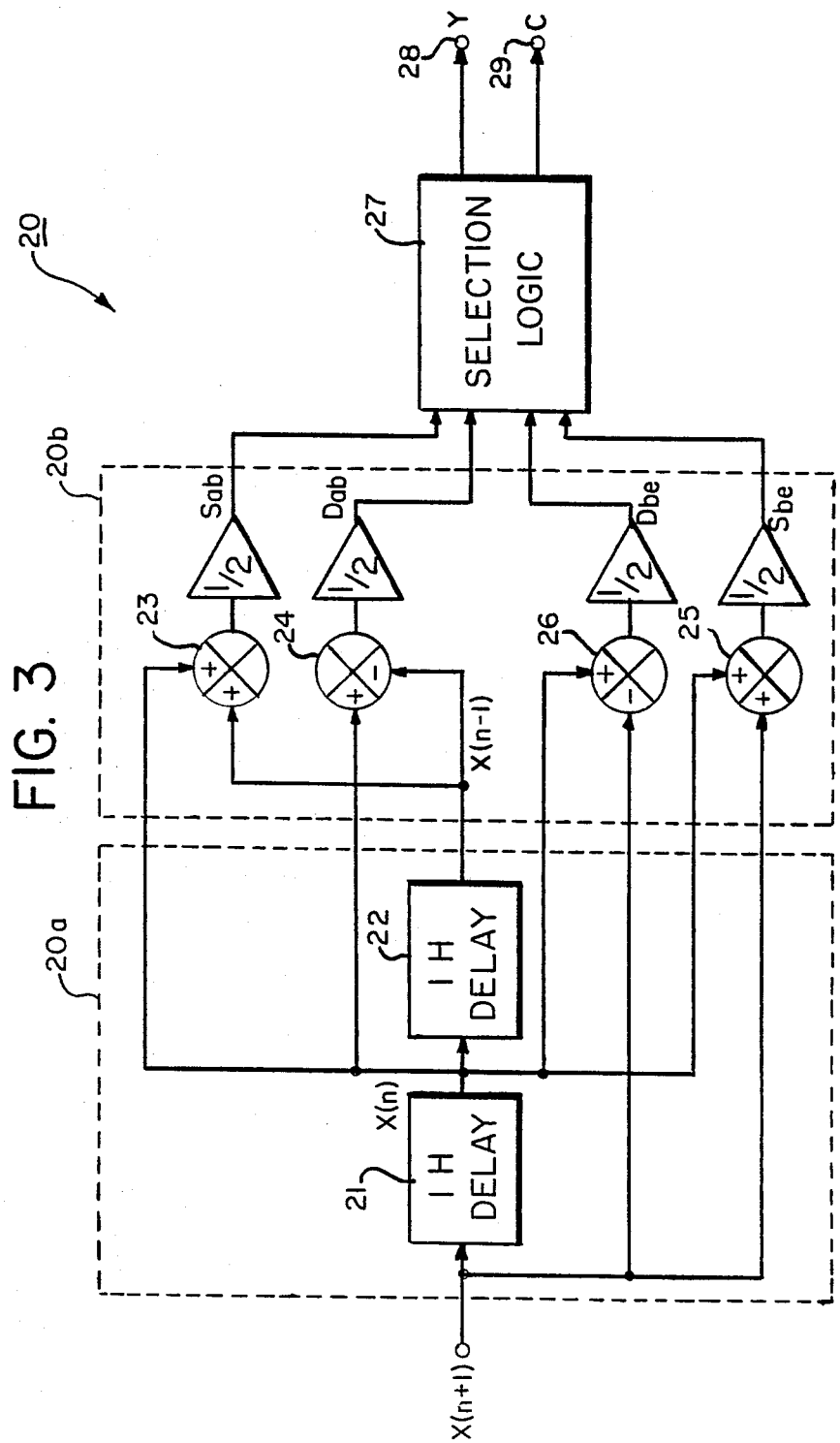
FIG. 3 is a block diagram of a preferred embodiment of the invention.

Such sum and difference sets may be provided by the adaptive filter 20 shown in FIG. 3. The first horizontal line $x(n-1)$ that is utilized in the processing by the filter 20 is delayed, in delay circuit 20a, by a time interval equal to two times a horizontal sweep time by a first delay element 21 and a second delay element 22, while the second line in the processing $x(n)$, the line for which the luminance and chrominance signals are to be separated, is delayed for a time interval to one horizontal sweep time by the delay element 21 and the third horizontal line entering into the process $x(n+1)$, the line below the present line of interest, is not delayed at all.

A sum and difference set for line above processing is provided by summing $x(n)$ with $x(n-1)$ in summation network 23 and subtracting $x(n-1)$ from $x(n)$ in summation network 24 of summing circuit 20b to respectively provide $S_{ab}, D_{ab}$. Similarly a sum and difference set for line below processing is provided by summing $x(n)$ with $x(n+1)$ in summation network 25 to obtain $S_{be}$ and subtracting $x(n+1)$ from $x(n)$ in summation network 26 to obtain $D_{be}$. These sum and difference sets are coupled to selection logic circuitry 27 wherefrom the luminance and chrominance signals appear at the output terminals 28 and 29, respectively.

Figure 4:
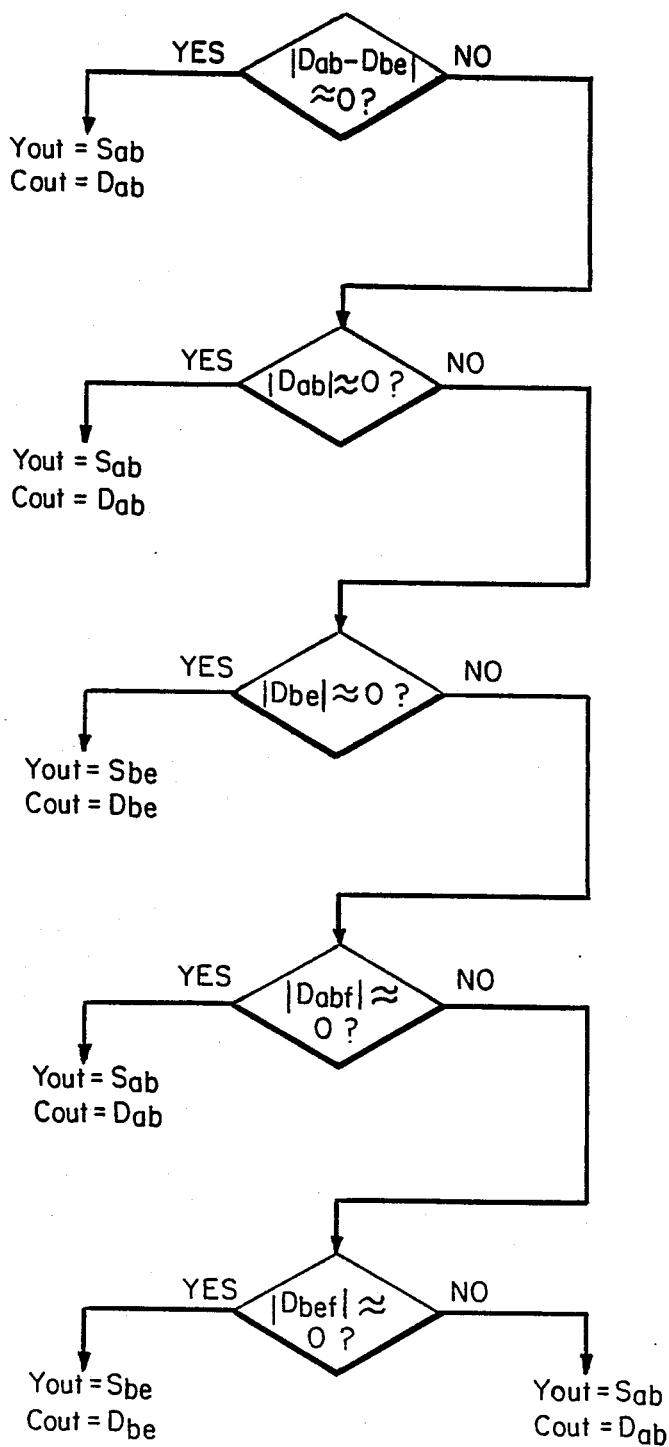
FIG. 4 is a flow chart of an algorithm that may be employed for the selection logic of FIG. 3.

Selection logic unit 27 chooses a sum and difference set on a pixel-by-pixel basis using the $D_{ab}$ and $D_{be}$ signals. This selection may be made in accordance with an algorithm, the flow chart of which is shown in FIG. 4. First the absolute value of the difference between $D_{ab}$ and $D_{be}$ is investigated. If this value is substantially equal to zero the video signal is correlated vertically and both line above and line below processing may be employed. In this situation the conventional line above processing is chosen. Should the absolute value of the difference between $D_{ab}$ and $D_{be}$ not be equal to zero, the processing continues with an investigation of $D_{ab}$. If this signal is substantially equal to zero, substantially equal luminance information on the lines $x(n)$ and $x(n-1)$ with no chrominance information thereon is indicated. In this situation the proper choice is line above processing and the algorithm chooses $S_{ab}, D_{ab}$. Processing continues with an investigation of $D_{be}$ should the difference signal for the line above processing not be equal to zero. A value for $D_{be}$ substantially equal to zero indicates substantially identical luminance information on line $x(n)$ and $x(n+1)$ with substantially no chrominance information on these lines. In this situation, processing with the line below is chosen otherwise the processing continues.

When the value of $D_{be}$ is not equal to zero, two additional signals are needed to continue the processing. These are filtered values of $D_{ab}$ and $D_{be}$. Signals representative of these values are obtained by passing the difference signals resulting from the line above and the line below processing through a low pass filter which rejects the chroma sidebands, removing the chrominance component while passing the vertical detail component, which may be utilized for the processing selection. With these two filtered values $D_{abf}$ and $D_{bef}$ the mode selection process continues by first investigating $D_{abf}$. If this value is substantially equal to zero, indicating that no vertical transition has occurred from the line above, the signal set $S_{ab}$ and $D_{ab}$ is chosen. Should the filtered difference signal obtained from the line above processing not be equal to zero the processing continues by investigating the filtered difference signal obtained from the line below processing. If this signal is substantially equal to zero, indicating that no vertical transition has occurred to the line below, the line below sum and difference signals $S_{be}$ and $D_{be}$ are chosen. In the event that the filtered difference signal obtained from the line below processing is also not equal to zero then the system is directed to utilize the conventional line above processing.

Figure 5:
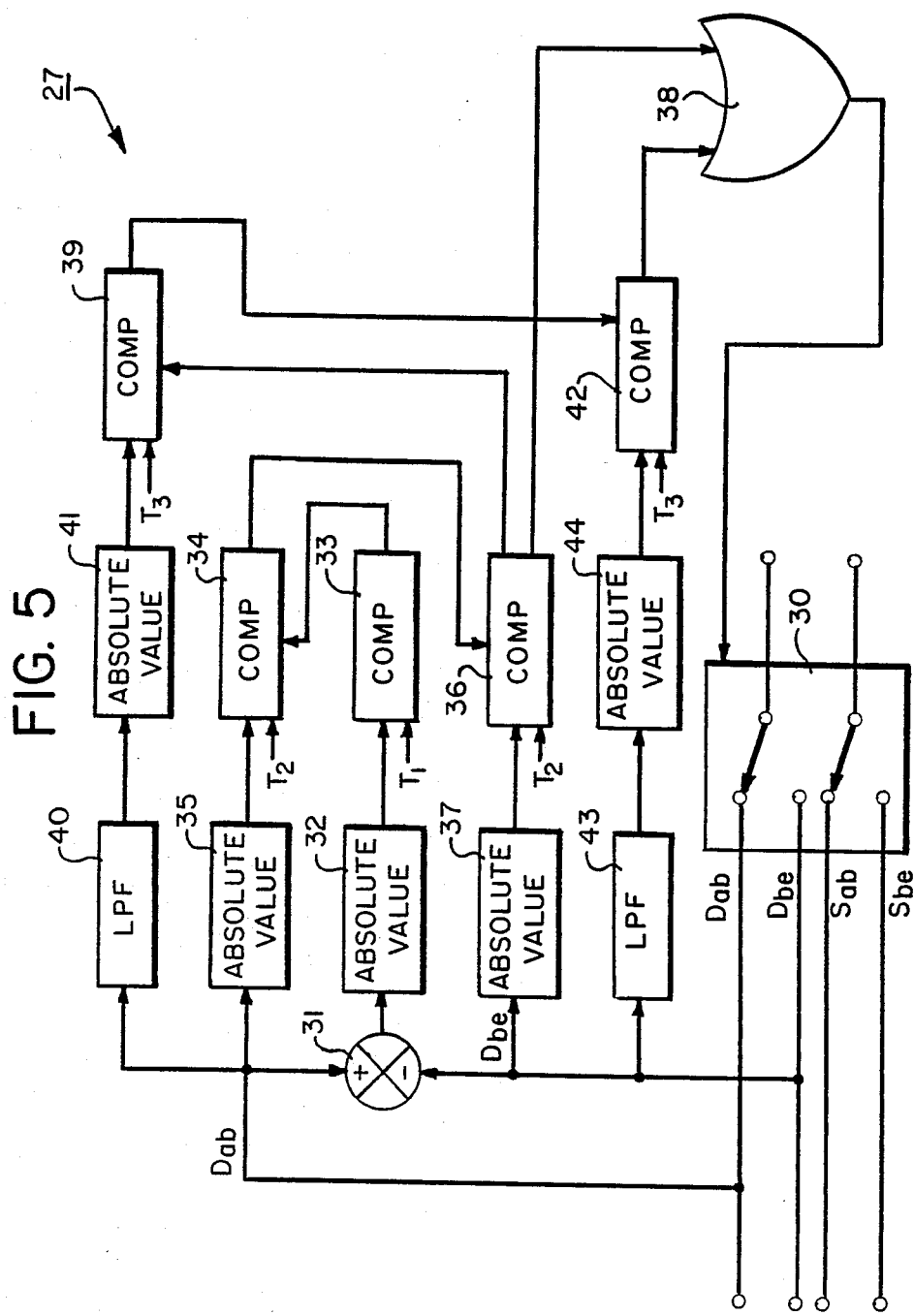
FIG. 5 is a block diagram of a circuit that may be employed to implement the logic of FIG 4.

A block diagram of a circuit capable of performing the logic indicated in the flow chart of FIG. 4 is shown in FIG. 5. The sum and difference signals for the line above and line below processing are coupled to a switch 30 which is normally set to select the sum and difference set obtained with the line above processing and is switched to select the set obtained with the line below processing only when the logic circuitry so indicates. The two difference signals are coupled to summation network 31, where the difference therebetween is obtained. The absolute value of this signal is coupled from the absolute value element 32 to a comparator having a threshold level $T_1$. This threshold level is near zero and selected in accordance with a predetermined tolerance limit. If the absolute value coupled from element 32 exceeds the threshold of the comparator 33, an enabling signal is coupled to a comparator 34 wherein the absolute value of $D_{ab}$ from an absolute value element 35 is compared with a second threshold $T_2$. The level of this threshold is near zero and chosen in accordance with a predetermined tolerance. If the absolute value of the signal couple from element 35 exceeds the threshold $T_2$, an enabling signal is coupled to a comparator 36 wherein the absolute value of the difference signal obtained with the line below processing coupled from an absolute value circuit 37 is compared with the threshold value $T_2$. If the absolute value signal coupled from the element 37 does not exceed the threshold $T_2$, an activating signal is coupled to the switch 30 via OR gate 38 thereby selecting the sum $S_{be}$ and difference $D_{be}$ set for the line below processing. If the absolute value signal from the element 37 does exceed the threshold $T_2$ an enabling signal is coupled to another comparator 39.

The difference signal obtained from the line above processing is also coupled to a low pass filter 40 wherein chroma sidebands are rejected, thereby removing the chrominance component and providing a signal representative of the vertical detail component to an absolute value circuit 41. Signals representative of the absolute value of the filtered difference signal from the line above processing $D_{abf}$ are coupled to comparator 39 for comparison to a third threshold $T_3$ that is near zero and chosen in accordance with a predetermined tolerance. If the signal from the absolute value element 41 exceeds the threshold $T_3$, an enabling signal is coupled from comparator 39 to a comparator 42, wherein a signal $D_{bef}$ representative of the absolute value obtained by passing the difference signal resulting from the line below processing through a low pass filter 43, which is identical to the low pass filter 40, and therefrom to an absolute value circuit 44, is compared to the threshold level $T_3$. If the absolute value of the filtered difference signal $D_{bef}$ does not exceed the threshold $T_3$ an activating signal is coupled by an OR gate 33 to the switch 30, thereby selecting the sum and difference pair obtained with the line below processing. If this signal exceeds the threshold $T_3$ the switch is not activated and remains in a position to select the sum and difference signals for the line above processing.

In addition to the suppression of "hanging dots", the adaptive non-linear comb filter described above may be employed to eliminate cross color components inherent in the combed chroma output $D_{ab}$ of a conventional 1-H comb filter when diagonal luminance transitions are present. Referring to FIG. 6, a composite video signal having a diagonal luminance transition may be represented with luminance level $Y_1$ to the left of the diagonal and a second luminance level $Y_2$ to the right. $D_{ab}$ and $D_{be}$ for this situation both exhibit cross color components along the diagonal, the cross color component being represented by $0.5(Y_2-Y_1)$ for $D_{ab}$, $0.5(Y_1-Y_2)$ for $D_{be}$, and $0.5(Y_1+Y_2)$ for $S_{ab}$ and $S_{be}$. By selectively utilizing line-above and line-below processing, as described above, uncorrupted, luminance $Y_{out}$ and chrominance $C_{out}$ signals may be obtained with the mode transitions along the diagonal as shown in FIG. 6. It should be apparent from the composite video representation that either line-above or line-below processing in the region to the right of the line-below processing along the diagonal may be employed to establish the desired luminance and chrominance signals. $S_{ab}$ and $D_{ab}$ are indicated to be consistent with the preferred embodiment previously discussed. Those skilled-in-the-art will recognize that a minor modification to the switching circuitry could maintain line-below processing after the initial transition.

While the invention has been described in its presently preferred embodiments, it is to be understood that the words which have been used are words of description rather than limitation and that changes may be made within the purview of the appended claims without departing from the true scope and spirit of the invention in its broader aspects.

I claim:

1. An adaptive comb filter for separating luminance and chrominance video signals from first and second composite video signals, the first composite video signal formed by adding the chrominance video signal to the luminance video signal and the second composite video signal formed by subtracting the chrominance video signal from the luminance video signal, the first and second composite video signals associated with horizontal scan lines of a display system and interleaved so that each is provided every other horizontal scan line comprising:

means for receiving said first and second composite video signals;

means coupled to said receiving means for delaying said first and second composite video signals to provide signals delayed by one horizontal line time interval and signals delayed by two horizontal line time intervals:

summation means coupled to said receiving means and said delaying means for providing a first signal pair representative of a first sum and a first difference of signals at said receiving means and said signals delayed by one horizontal line time interval, and a second signal pair representative of a second sum and a second difference of signals delayed by one horizontal line time interval and signals delayed by two horizontal line time intervals;

means coupled to receive said first and second difference signals for providing a third difference signal representative of a difference between said first and second difference signals;

logic means coupled to receive said first, second, and third difference signals for providing a first switch signal when said third difference signal has an absolute value below a first absolute value threshold and for selecting between said first switch signal and a second switch signal in accordance with absolute values of said first and second difference signals when said absolute value of said third difference signal is above said first absolute value threshold; and switch means coupled to receive said first and second signal pairs and to said logic means for selecting one of said first and second signal pairs in accordance with switch signals supplied by said logic means.

2. The adaptive comb filter of claim 1 wherein said logic means further includes low pass filter means coupled to receive said first and second difference signals for removing chrominance components from said first and second difference signals to provide filtered first and second difference signals, said filtered first and second difference signals being coupled to said logic means for processing with said first and second difference signals when said third difference signal has an absolute value above said first absolute value threshold.

3. An adaptive cone filter in accordance with claim 2 wherein said logic means includes means for providing said first switch signal when said absolute value of said third difference signal is above said absolute value threshold and said first difference signal has an absolute value below a second absolute value threshold and selects between said first and second switch signals in accordance with absolute values of said second difference signal and said first and second filtered difference signals when said first difference signal has an absolute value said second absolute value threshold.

4. An adaptive cone filter in accordance with claim 3 wherein said logic means includes means for providing said second switch signal when said absolute value of said first difference signal is above said second absolute value threshold and said second difference signal is below said second absolute value threshold and selects between said first and second switch signals in accordance with absolute values of said first and second filtered difference signals when said second difference signal is above said second absolute value threshold.

5. An adaptive cone filter in accordance with claim 4 wherein said logic means further includes means for providing said first switch signal when said absolute value of said second difference signal is above said second absolute value threshold and said absolute value of said first filtered difference signal is below a third absolute value threshold and selects between said first and second switch signals in accordance with said absolute value of said second filtered difference signal when said absolute value of said first filtered difference signal is above said third absolute value threshold.

6. An adaptive cone filter in accordance with claim 5 wherein said logic means further includes means for providing said first switch signal when said first filtered difference signal is above said third threshold and said second filtered difference signal is below said third absolute value threshold and said second switch signal when said second filtered difference signal is above said third absolute value threshold.

7. A method of processing first composite video signals representative of the sum of luminance and chrominance video signals and second composite video signals representative of the difference between the luminance and chrominance video signals to provide separated luminance and chrominance video signals, the first and second composite video signals associated with horizontal scan lines of a display system and interleaved so that each is provided with every other horizontal scan line comprising the steps of:

receiving said first and second composite video signals to provide received signals;

delaying said received signals to provide signals delayed by one horizontal line time interval and signals delayed by two horizontal line time intervals;

summing said signals delayed by one horizontal line time interval with undelayed received signals to obtain a first signal pair representative of a first sum and a first difference of signals delayed by one horizontal line time interval and undelayed received signals;

summing said signals delayed by one horizontal line time interval with signals delayed by two time horizontal line time intervals to obtain a second signal pair representative of a second sum and a second difference of signals delayed by one horizontal line time interval and signals delayed by two horizontal line time intervals; and adding said first and second difference signals in a manner to obtain a third difference signal representative of a difference between said first and second difference signals;

processing said first, second, and third difference signals to provide a first switch signal when said third difference signal has an absolute value below a first absolute value threshold and to select between said first switch signal and second switch signal in accordance with absolute values of said first and second difference signals when said absolute value of said third difference signal is above said first absolute value threshold; and selecting one of said first and second signal pairs in accordance with switch signals provided by said processing means.

8. The method of claim 4 wherein the processing step further includes;

passing said first and second difference signals through a low pass filter to remove chrominance components from said first and second difference signals to provide filtered first and second difference signals, said filtered first and second difference signals being utilized in said processing step with said first and second difference signals in accordance with said preselected criteria to obtain said switch signals when said third difference signal has an absolute value above said first absolute value threshold.

* * * * *